(12) United States Patent
Ehrlich et al.

(10) Patent No.: US 6,336,878 B1
(45) Date of Patent: Jan. 8, 2002

(54) CONTINUOUSLY VARIABLE TRANSMISSION

(75) Inventors: Matthias Ehrlich, Bühl; Bernhard Walter, Oberkirch, both of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/314,469

(22) Filed: May 18, 1999

(30) Foreign Application Priority Data

May 18, 1998 (DE) .......................................... 198 22 266

(51) Int. Cl.⁷ .......................... F16H 59/00; F16H 61/00; F16H 63/00
(52) U.S. Cl. ............................. 474/28; 474/18; 474/19
(58) Field of Search ............................. 474/28, 18, 19, 474/20, 25, 69, 70, 29, 21, 43, 44

(56) References Cited

U.S. PATENT DOCUMENTS

| | | | |
|---|---|---|---|
| 5,184,981 A | * 2/1993 | Wittke | 474/28 X |
| 5,217,412 A | 6/1993 | Indlekofer et al. | |
| 5,334,108 A | * 8/1994 | Lamers | 474/28 X |
| 5,711,730 A | 1/1998 | Friedman et al. | |
| 5,776,022 A | * 7/1998 | Schellekens | 474/28 X |
| 5,803,846 A | * 9/1998 | Yamada et al. | 474/28 X |
| 6,012,998 A | * 1/2000 | Schutz et al. | 474/43 |
| 6,015,359 A | * 1/2000 | Kunii | 474/28 X |

FOREIGN PATENT DOCUMENTS

| | | |
|---|---|---|
| DE | 41 33 724 | 2/1992 |
| DE | 42 01 692 | 8/1992 |
| DE | 195 44 644 | 6/1996 |

\* cited by examiner

Primary Examiner—David A. Bucci
Assistant Examiner—Marcus Charles
(74) Attorney, Agent, or Firm—Darby & Darby

(57) ABSTRACT

A continuously variable transmission for use in the power train of a motor vehicle has parallel input and output shafts, an adjustable pulley on each shaft, an endless torque transmitting chain or belt trained over the pulleys, and a torque sensor which transmits variable torque from the engine of the motor vehicle to the pulley on the input shaft. The torque sensor also serves to initiate and regulate the adjustments of the pulleys.

26 Claims, 5 Drawing Sheets

CONTINUOUSLY VARIABLE TRANSMISSION

BACKGROUND OF THE INVENTION

The invention relates to continuously variable transmissions (CVT) of the type employing rotary input and output shafts, adjustable pulleys on the shafts, and an endless flexible element (such as an endless flexible chain or belt and hereinafter called chain for short) which is trained over the pulleys. Transmissions of such character are preferred by numerous makers of motor vehicles or power trains for use in motor vehicles because they exhibit important advantages over other types of continuously variable transmissions, e.g., those which employ planetary gears. Thus, the ride in a motor vehicle comprising a power train embodying a continuously variable transmission which comprises input and output shafts with adjustable pulleys and an endless chain trained over the pulleys is more comfortable to the operator and other occupants of the motor vehicle, and the engine can be operated with considerable savings in fuel consumption.

Published German patent application Serial No. 195 44 644 A1 discloses a continuously variable transmission with two adjustable pulleys and an endless chain which serves to transmit torque from the adjustable pulley on the input shaft to the adjustable pulley on the output shaft. Each pulley comprises a first flange which is fixedly secured to the respective shaft, and a second flange which cannot rotate with reference to the respective shaft but is movable axially toward and away from the associated fixed flange. First plenum chambers are provided at those sides of the axially movable flanges which face away from the associated first flanges. The pressure of a hydraulic fluid in such chambers is regulated in dependency upon the magnitude of the torque being transmitted to the input shaft at any given time. Such mode of operation is desirable because it ensures that the chain cannot slip, or is less likely to slip, relative to the adjacent surfaces of the flanges. Changes in the ratio of the transmission are effected by changing the pressure of fluid in additional plenum chambers which are outwardly adjacent the respective first plenum chambers. A torque sensor is integrated into the just described conventional transmission to monitor the magnitude of the torque being transmitted from a prime mover (such as an internal combustion engine) to the input shaft of the transmission.

As a rule, and as already mentioned hereinbefore, the first plenum cambers are located between the additional plenum chambers and the axially movable flanges of the respective pulleys. The arrangement is normally such that each first plenum chamber is immediately adjacent the respective axially adjustable flange. On the other hand, the additional plenum chambers are immediately adjacent to pistons which are directly connected to the respective axially movable flanges. A third plenum chamber is or can be provided between each first plenum chamber and the respective additional plenum chamber. The third plenum chamber receives and/or discharges hydraulic fluid by way of a throttling orifice, and its purpose is to compensate for those rises of fluid pressure which are attributable to forces developing as a result of rotation of the shafts and pulleys when the transmission is in use. However, the utilization of such third plenum chambers results in considerable pumping losses because of uninterrupted flow of pressurized fluid from the first plenum chambers. In addition, the third plenum chambers impose a lower limit upon the duration of changes of the transmission ratio. The reason is that, when the volume of a third chamber is being reduced, some of the fluid must be expelled from the third chamber into the atmosphere by way of one or more narrow flow restrictors which impose a lower limit upon the speed of adjustment of the transmission ratio.

The aforementioned published German patent application Serial No. 195 44 644 A1 further discloses a hydromechanical torque sensor which is installed to transmit to the pulley on the input shaft the entire torque being supplied by a prime mover. More specifically, the torque sensor comprises an axially fixed first cam and an axially movable second cam, and the cams are provided with confronting ramps engaging spherical distancing or spreading members which are disposed between the two cams. The second cam is movable axially of but cannot rotate relative to the input shaft of the transmission. It is necessary to ensure that the pressure of hydraulic fluid in the first plenum chambers is variable at least as a function of the transmitted torque; this ensures that the flanges bear upon the marginal portions of the chain without any or with minimal slip. In other words, if the magnitude of the transmitted torque increases, then the torque sensor must ensure that the fluid pressure in the first chambers increases accordingly. Analogously, if the magnitude of transmitted torque is reduced, the torque sensor initiates a reduction of fluid pressure in the first plenum chambers because the likelihood of slippage between the flanges of the pulley on the one hand, and the marginal portions of the chain on the other hand, is less pronounced. When the transmission ratio reaches a certain value, the first and the adjacent second chambers are permitted to communicate with each other by way of the respective axially movable flanges to thus account for an increased area of contact with the chain, i.e., the pressure of fluid in the first plenum chambers is reduced.

The just outlined construction and mode of operation of the torque sensor which is disclosed in the aforementioned published German patent application ensure that the pressure between the conical surfaces of the flanges and the marginal portions of the chain can be regulated as a function of the momentary transmission ratio, i.e., of the radii of those arcuate portions of the endless chain which are trained over the two pulleys. This renders it possible to ensure that the torque sensor operates not unlike a multistage torque sensor.

However, the just described torque sensor also exhibits certain drawbacks. For example, the space requirements of the torque sensor, as seen in the axial direction of the input shaft, are rather pronounced which is evidently undesirable in many types of motor vehicles. Moreover the torque sensor is quite complex and comprises a rather substantial number of component parts.

Published German patent application Serial No. 42 01 692 A1 discloses a continuously variable transmission which comprises a dual cylinder-and-piston arrangement wherein the axially movable flange of each of the two pulleys is associated with a double-acting cylinder and piston unit, and such units are radially offset relative to each other. The arrangement is such that each cylinder-and-piston unit can furnish a fluid at a desired pressure, i.e., each of the units can pressurize the fluid to a desired extent independently of the pressure in the other unit. Thus, the radially inner plenum chamber contains a body of fluid the pressure of which is just sufficient to ensure the transmission of a desired torque from the pulley on the input shaft to the pulley on the output shaft. On the other hand, the fluid in the radially outer cylinder-and-piston units is pressurized only when the transmission ratio must be changed, i.e., if the ratio of the transmission is to be changed in actual use, e.g., in the power train of a motor vehicle.

Another feature of the continuously variable transmission which is disclosed in the published German patent application Serial No. 42 01 692 A1 is that the running endless flexible chain contributes to an increase of the force acting between such endless chain and the flanges of the pulley on the input shaft of the transmission. Such force is compounded by the force which is furnished by pressurized fluid in the second plenum chambers.

Further double-acting cylinder and piston units are disclosed in published German patent application Serial No. 41 33 724 A1. The two plenum chambers which are associated with each axially movable flange are axially offset relative to each other and are free to communicate with one another, i.e., the axial forces attributable to the provision of such plenum chambers which communicate with one another are compounded.

The disclosures of all patents and patent applications which are identified in the specification of the present application are incorporated herein by reference.

OBJECTS OF THE INVENTION

An object of the instant invention is to provide a continuously variable transmission which is designed in such a way that its ratio can be changed within short intervals of time.

Another object of the invention is to provide a relatively simple, compact and inexpensive continuously variable transmission which can be utilized as a superior substitute for the aforedescribed conventional continuously variable transmissions.

A further object of the invention is to provide a continuously variable transmission which takes up a surprisingly small amount of space in the axial direction of its input and output shafts.

An additional object of the invention is to provide a continuously variable transmission wherein the number of separately produced parts is small or even negligible in comparison with the number of constituents of a conventional continously variable transmission of the type employing parallel input and output shafts, an adjustable pulley on each shaft, and an endless flexible chain trained over the pulleys.

Still another object of the invention is to provide a novel and improved torque sensor for use in the above outlined continuously variable transmission.

A further object of the invention is to provide a torque sensor which is superior to those utilized in presently known continuously variable transmissions with hydrokinetic torque converters.

Another object of the invention is to provide a novel and improved power train which can be utilized in a motor vehicle and employs a continuously variable transmission of the above outlined character.

An additional object of the invention is to provide a novel and improved array of fluid-confining chambers for use in the above outlined transmission.

A further object of the invention is to provide a novel and improved method of assembling and operating a continuously variable transmission of the above outlined character.

Still another object of the invention is to provide novel and improved constituents of a continuously variable transmission.

An additional object of the invention is to provide novel and improved means for moving the axially movable flanges relative to axially fixed flanges of pulleys on the input and output shafts of a continuously variable transmission, particularly a transmission which can be utilized in the power train of a motor vehicle and can receive torque from the output element (such as a crankshaft or a camshaft) of an internal combustion engine or another prime mover.

Another object of the invention is to provide novel and improved fluid flow regulating valves which are constituted by portons of the shafts and axially movable flanges of adjustable pulleys in a continuously variable transmission of the above outlined character.

SUMMARY OF THE INVENTION

A first feature of the invention resides in the provision of a continuously variable transmission which comprises a first shaft arranged to rotate about a first axis, a first pulley provided on the first shaft, a second shaft which is rotatable about a second axis and is or can be parallel to the first shaft, and a second pulley including a first conical flange affixed to the second shaft and a second conical flange non-rotatably mounted on and movable axially of the second shaft toward and away from the first flange. The transmission further comprises an endless flexible torque transmitting element (such as a belt or chain) which is trained over the two pulleys, and means for moving the second flange of the second pulley toward and away from the first flange of the second pulley. The moving means includes a first piston which is carried by and is held against axial movement relative to the second shaft and defines with the second flange a first annular plenum chamber, a supporting member which is affixed to the second shaft, and a second piston which is affixed to the second flange and defines with the supporting member a second annular plenum chamber. The first and second pistons define a third annular plenum chamber which is disposed between the first and second chambers, as seen in the axial direction of the second shaft. The moving means further comprises discrete first, second and third means for respectively connecting the first, second and third chambers with at least one source of pressurized hydraulic fluid, and means (such as a set of valves) for regulating the flow of fluid in the second and third connecting means in such way that the pressure of fluid in one of the second and third chambers is reduced simultaneously with a rise of fluid pressure in the other of the second and third chambers.

The second flange of the second pulley can include a cylindrical portion which is remote from the axis of the second shaft, and a hub which surrounds the second shaft. The first piston can be mounted for movement axially of the second shaft between the cylindrical portion and the hub of the second flange, and the supporting means can include a cylindrical wall which is coaxial with and is spaced apart from the second shaft and has an end portion affixed to the first piston. The second piston is movable with the second flange axially of the second shaft and relative to the cylindrical wall of the supporting means, and the third connecting means can include a first channel provided in the supporting member and a second channel provided in the second shaft.

The first pulley preferably comprises a third conical flange affixed to the first shaft, and a fourth conical flange which is non-rotatably mounted on and is movable axially of the first shaft toward and away from the third flange. Such transmission preferably further comprises fluid-operated means (e.g., a cylinder and piston arrangement) including a fourth chamber and serving to move the fourth flange relative to the third flange.

The just described transmission can further comprise means (e.g., a connection between the rotary output element of the engine and the first flange of the second pulley) for rotating the second shaft. The endless flexible element is then arranged to transmit torque from the second shaft to the first shaft. The aforementioned fluid-operated means can include means for maintaining the pressure of fluid in the fourth chamber at a value which at least approximates the fluid pressure in the first chamber and is a function of the magnitude of torque being transmitted by the endless flexible torque transmitting element.

Another feature of the present invention resides in the provision of a torque sensor which can be utilized in a continuously variable transmission having an input shaft, a pulley including a first flange which is affixed to the shaft and a second flange which is non-rotatably mounted on and is movable axially of the shaft toward and away from the first flange, and an endless flexible element trained over the pulley. The improved torque sensor comprises first and second cams which are coaxial with the input shaft and have confronting surfaces provided with complementary ramps, at least one (e.g., spherical) spreading element disposed between and contacting the complementary ramps, and a gear which is coaxial with and is rotatably mounted on the input shaft. The second cam is non-rotatably and axially movably mounted on the gear, and the torque sensor further comprises an annular piston which surrounds the input shaft, which abuts the second cam and which is movable axially of the input shaft. The second cam has a side facing away from the first cam, and the torque sensor further comprises first and second plenum chambers which spacedly surround the input shaft and one of which is nearer to the shaft than the other chamber (as seen in the radal direction of the shaft. Still further, the torque sensor comprises a substantially disc-shaped member which forms part of the first cam, which is made at least in part of sheet metal, which is non/rotatably affixed to the first flange, and which includes a substantially cylindrical portion surrounding the two chambers and the second cam. The first cam further includes an intermediate portion extending from the substantially cylindrical portion toward the input shaft; the at least one spreading element is disposed between the intermediate portion of the first cam and the second cam.

The piston is preferably configured and mounted in such a way that it has a side which faces the first flange of the pulley and is provided with a first annular extension extending toward the first flange and spacedly and concentrically surrounding the input shaft. The first flange preferably includes a second annular extension and the one plenum chamber (namely the chamber nearer to the axis of the input shaft) is bounded by a peripheral surface of the input shaft, by the first annular extension (of the piston) and by the first flange. The substantially cylindrical portion of the first cam has an internal surface which confronts the periphery of the input shaft and serves to guide a radially outer portion of the piston for movement in the direction of the axis of the input shaft. The other plenum chamber (namely the chamber which is more distant from the axis of the input shaft) is bounded by the substantially cylindrical portion of the first cam, by the piston, by the second extension (of the first flange) and by another part of the first flange.

The radially outer portion of the piston can be provided with a sealing element (e.g., an O-ring) which abuts the internal surface of the substantially cylindrical portion of the first cam. Such sealing element can be received in a circumferential groove of the radially outer portion of the piston.

It is desirable to install an annular sealing element between the annular extension of the piston and the annular extension of the first flange; such sealing element can be received in a groove of one of the two annular extensions, e.g., in the annular extension of the first flange.

The first cam can be configured and mounted in such a way that it comprises an end portion extending substantially radially outwardly from the substantially cylindrical portion and including suitable protuberances in the form of lugs, fingers or the like. The first flange then preferably comprises an annular projection which is adjacent the end portion of the first cam and is coaxial with the input shaft; this projection is provided with recesses for the protuberances on the aforementioned end portion of the first cam. Such torque sensor preferably further comprises a sealing element which is interposed between the first flange of the pulley and the end portion of the first cam; this sealing element can be received in an annular groove of the first flange.

An internal surface of the annular projection of the first flange can be provided with an annular groove for a safety ring (e.g., a detachable split ring) which serves to hold the first cam against axial movement relative to the first flange of the pulley on the input shaft.

The intermediate portion of the first cam can be provided with at least one recess for the at least one spreading element.

The torque sensor further comprises means for moving the second flange of the pulley axially of the input shaft. Such moving means can include at least one hydraulic motor (e.g., a single-acting or double-acting cylinder and piston unit) having at least one additional (third) plenum chamber for a supply of pressurized fluid (e.g., oil), and means for connecting the third plenum chamber with one of the first and second plenum chambers. The connecting means can comprise passages (e.g., in the form of channels, grooves, bores or holes) which are provided in the input shaft and in at least one of the flanges.

The second flange of the pulley can be provided with a control edge (e.g., defined by a circumferentially complete internal annular shoulder) which is adjacent the shaft. The hydraulic motor of the means for moving the second flange relative to the input shaft toward and away from the first flange includes the aforementioned at least one additional or third plenum chamber for a supply of pressurized fluid, and the means for connecting the first and/or second plenum chamber with the third plenum chamber can comprise at least one passage (e.g., a bore) provided in the input shaft and having an open end adjacent the control edge so that the latter can regulate the rate of fluid flow in the at least one passage in response to axial movement of the second flange relative to the shaft.

A further feature of the invention resides in the provision of a continuously variable transmission which comprises an input shaft rotatable about a predetermined axis, and a pulley including a first flange affixed to (e.g., of one piece with) the shaft and a second flange non-rotatably mounted on and movable axially of the shaft toward and away from the first flange. The second flange has a cylindrical portion spacedly surrounding the input shaft and extending away from the first flange (as seen in the axial direction of the input shaft). The transmission further comprises an endless flexible torque transmitting element (chain or belt) which is trained over the pulley, and means for moving the second flange toward and away from the first flange. The moving means comprises a first piston having a section defining with the second flange a first plenum chamber. The first piston has a radially inner portion which is slidable along a radially inner portion of the second flange, and a radially outer portion which is slidable within the cylindrical portion of the second flange. The moving means further comprises a cylinder which is mounted on the input shaft and defines a second plenum chamber with a second piston which is affixed to the second flange. The second plenum chamber surrounds the radially inner portion of the second flange.

The first piston can be provided with an annular trough (e.g., an annular depression in a selected portion of a sheet metal blank which is converted into the first piston in a suitable deforming machine) which is radially outwardly adjacent the aforementioned portion of the second flange, which extends toward the first flange and which includes a cylindrical portion; such cylindrical portion surrounds a radially outer portion of the cylinder.

The transmission can further comprise at least one first sealing element disposed between the cylindrical portion of the second flange and the first piston, and at least one second sealing element between the radially inner portion of the first piston and the radially inner portion of the second flange. The at least one first sealing element can be recessed into the cylindrical portion of the second flange and/or into the first piston, and the at least one second sealing element can be recessed into the first piston and/or into the radially inner portion of the second flange.

At least one sealing element can be interposed between the second piston and a cylindrical radially outer portion of the cylinder; such sealing element can include a ring which is recessed into the cylinder and/or into the second piston.

In accordance with a presently preferred embodiment, the transmission further comprises novel and improved means for admitting oil or another suitable pressurized hydraulic fluid into the second plenum chamber. Such admitting means can include at least one first passage which is provided in the input shaft, and at least one second passage provided in the radially inner portion of the second flange. The at least one second passage communicates with the at least one first passage in at least one predetermined axial position of the second flange relative to the input shaft.

The means for supplying a pressurized fluid to the first plenum chamber can include at least one first passage provided in the second flange, an internal recess provided in the second flange and communicating with the at least one first passage, and at least one second passage provided in the shaft and communicating with the recess in at least one predetermined axial position of the second flange relative to the input shaft. The recess can constitute a relatively wide circumferentially complete groove in the internal surface of the second flange.

The novel features which are considered as characteristic of the invention are set forth in particular in the appended claims. The improved transmission itself, however, both as to its construction and the modes of assembling and utilizing the same, together with numerous additional important features and attributes thereof, will be best understood upon perusal of the following detailed description of certain presently preferred specific embodiments with reference to the accompanying drawings.

DESCRIPTION OF PREFERRED EMBODIMENTS

Figure 1:
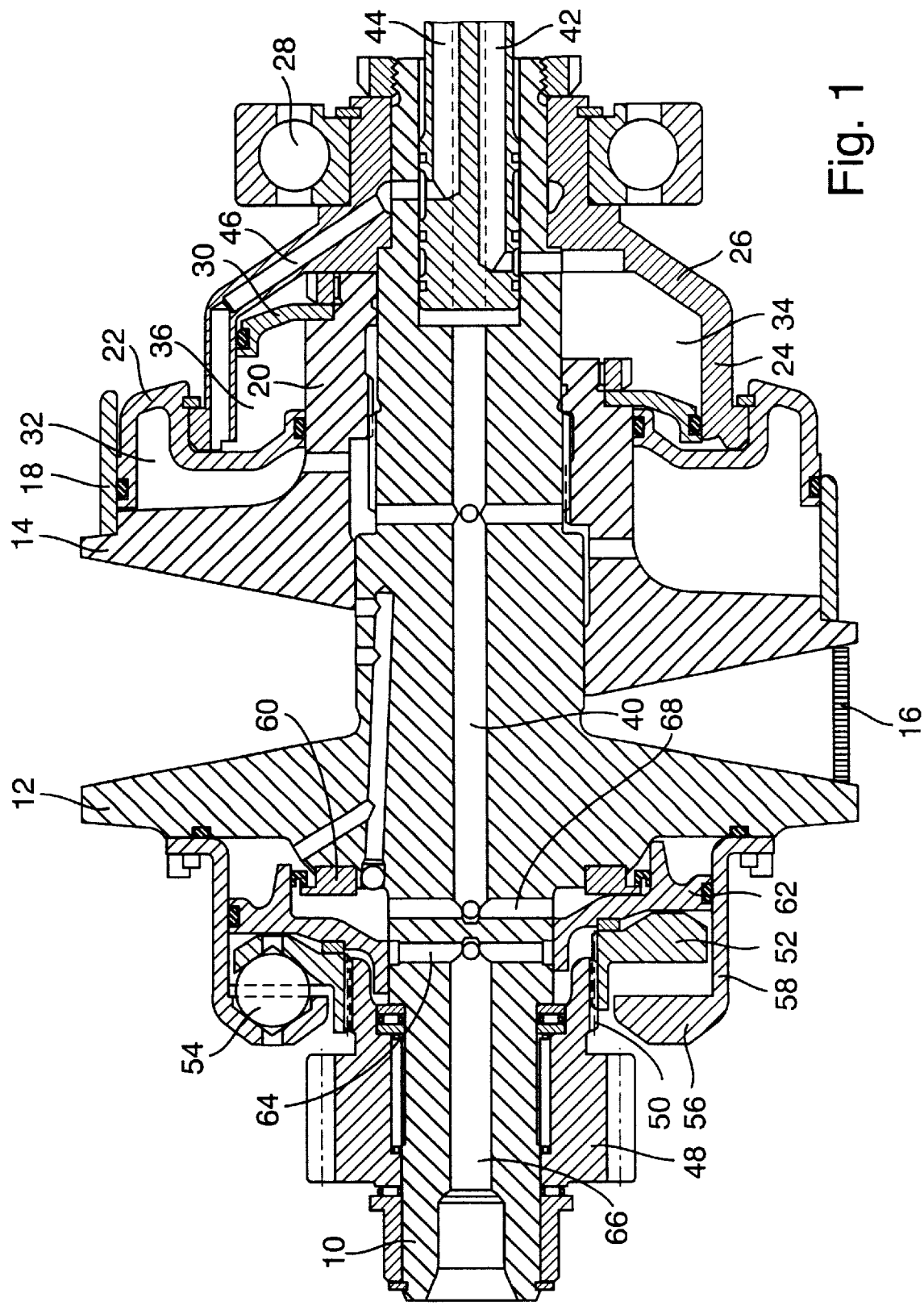
FIG. 1 is a fragmentary axial sectional view of a continuously variable transmission which embodies one form of the invention.
Figure 2:
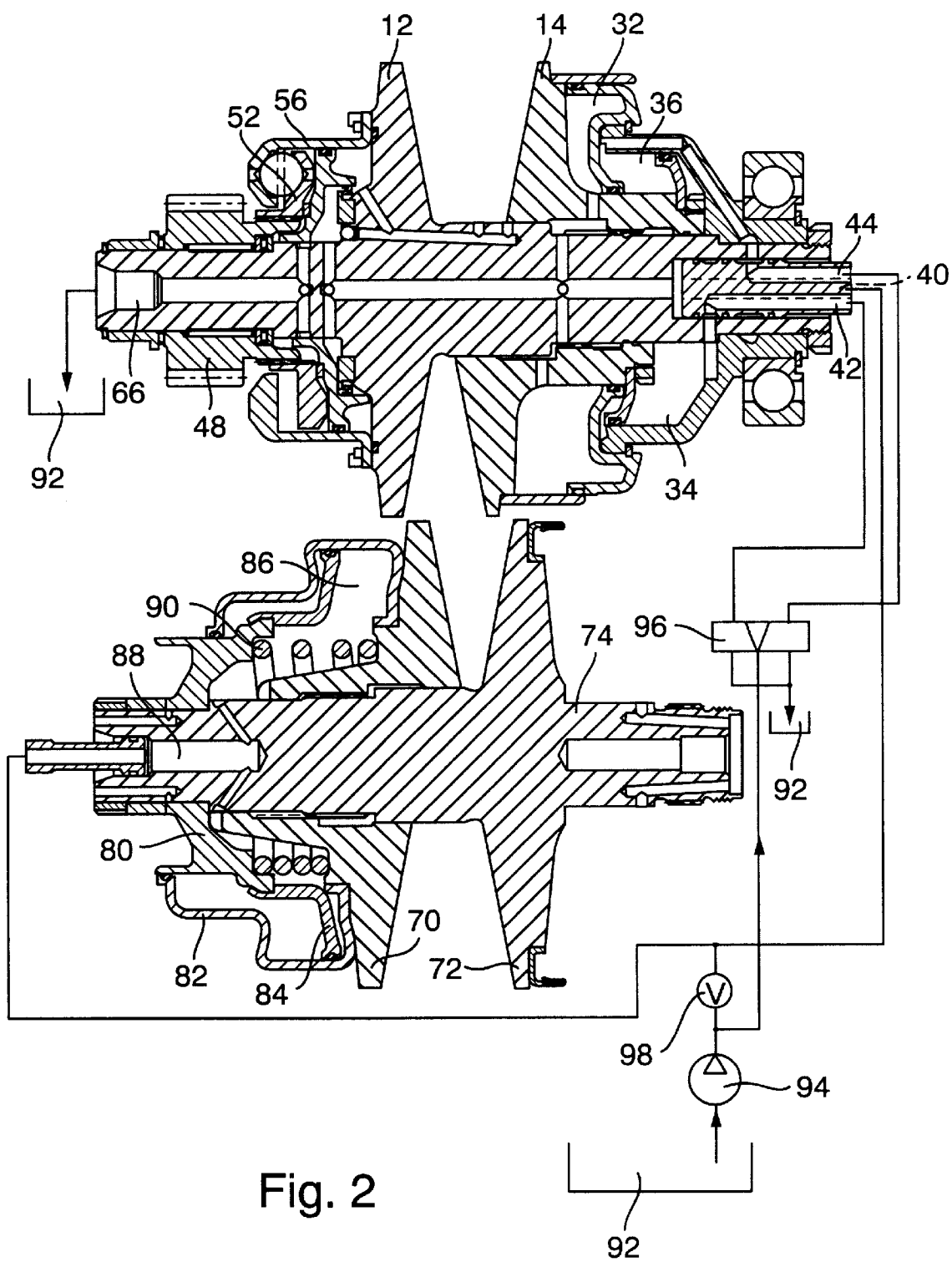
FIG. 2 is a similar but smaller-scale axial sectional view of the transmission including the structure shown in FIG. 1 and certain constitutents of the hydraulic regulating system for the axially movable flanges of the adjustable pulleys on the input and output shafts of the transmission.

FIGS. 1 and 2 show a continuously variable transmission (CVT) which comprises an input shaft 10 adapted to be driven by a suitable prime mover, such as by the output shaft of a combustion engine in the power train of a motor vehicle. The input shaft 10 carries a first adjustable pulley or sheave including a first flange 12 which is or which can be of one piece with the shaft 10, and a second flange 14 which is non-rotatably but axially movably carried by the shaft 10. The upper half of FIG. 1 shows the flange 14 in a position at a maximum axial distance from the flange 12, and the lower half of FIG. 1 shows the flange 14 in a position at a minimum axial distance from the flange 12.

An endless flexible element 16 (such as a chain or belt and hereinafter called chain for short) is trained over the pulley including the flanges 12, 14 in such a way that its marginal surfaces abut against the adjacent radially outwardly flaring conical surfaces of these flanges. That portion of the chain 16 which is trained over the pulley including the flanges 12, 14 travels radially outwardly (i.e., away from the axis of the input shaft 10) in response to axial movement of the flange 14 toward the flange 12. This increases the ratio of the illustrated continuously variable transmission.

The chain 16 serves to transmit torque from the input shaft 10 to an output shaft 74 which is shown in the lower half of FIG. 2 and can be utilized to transmit torque to a differential in the power train of a motor vehicle. The shaft 74 carries an axially fixed first flange 72 and an axially movable second flange 70.

The axially movable flange 14 on the input shaft 10 has a radially outer portion remotest from the shaft 10 and carrying a tubular wall 18 (e.g., a short circular cylinder) which is welded or otherwise secured to the radially outer portion of the flange 14 so that the shaft 10, the flange 14 and the wall 18 rotate as a unit. The wall 18 is located at that side of the flange 14 which faces away from the chain 16. The radially inner portion or hub 20 of the flange 14 surrounds the adjacent portion of the shaft 10 and extends in a direction axially of and away from the flange 12. The internal surface of the wall 18 and the external surface of the hub 20 serve to guide an axially movable piston 22. The parts 14 (inclusive of its portions 18 and 20) and 22 define a first annular chamber 32 which is sealed against uncontrolled escape of a pressurized fluid, such as oil. One of the seals (e.g., an O-ring) is received in an external groove of the piston 22 and sealingly engages the internal surface of the wall 18; the other seal (e.g., also an O-ring) is recessed into the piston 22 and sealingly engages the cylindrical external surface of the hub 20.

The flange 14 is movable axially of the input shaft 10 and of the piston 22 because the latter is fixedly secured to the shaft 10 by way of an annular supporting member 26. The supporting member 26 comprises a cylindrical sleeve-like wall 24 affixed to the adjacent portion of the piston 22. The connection between the piston 22 and the shaft 10 can depart from that shown in FIG. 1 or in the upper part of FIG. 2, as long as it ensures that the piston 22 is held against angular and axial movement relative to the shaft 10.

The reference character 28 denotes an antifriction bearing (e.g., a standard ball or roller bearing) which serves to rotatably journal the supporting member 26 and the input shaft 10 in the housing or case (not shown) of the transmission embodying the structure of FIG. 1.

The right-hand axial end of the hub 20 of the axially movable flange 14 is rigidly secured to the radially inner portion of an axially movable piston 30. The radially outer portion of the piston 30 carries a sealing element (e.g., an O-ring) which engages the internal surface of the cylindrical wall 24 of the supporting member 26.

The pistons 22, 30, the wall 24 and the hub 20 define a (third) annular chamber 36 which is sealed from the first chamber 32. A further (second) annular sealing chamber 34 is provided between the supporting member 26, the hub 20 and the piston 30; this chamber is sealed from the chambers 32 and 36. Pressurized fluid which is admitted into the chamber 32 serves to urge the conical surface of the flange 14 against the adjacent endless lateral surface of the chain 16. On the other hand, the chambers 34, 36 can receive bodies of pressurized fluid which is utilized (when necessary) to change the axial position of the flange 14, i.e., to change the ratio of the continuously variable transmission.

The chamber 32 can receive pressurized hydraulic fluid from a suitable source (such as the pump 94 shown in FIG. 2) by way of an axial bore or channel 40 in the input shaft 10. An axially parallel bore 42 in the input shaft 10 serves to supply pressurized fluid to, or to evacuate fluid from, the chamber 34. The bore 42 communicates with the chamber 34 by way of at least one radially extending bore in the shaft 10. A third (axially parallel) bore 44 in the shaft 10 can supply pressurized fluid to the chamber 36. The bore 44 communicates with the chamber 36 by way of one or more radially extending channels in the shaft 10 and one or more inclined channels 46 in the supporting member 26. Each inclined channel 46 communicates with one or more axially parallel channels in the wall 24.

The input shaft 10 receives torque from a prime mover (not shown) by way of a driver gear 48, which is rotatably mounted on the shaft 10, and a torque sensor which operates between the gear 48 and the shaft 10. The gear 48 is held against axial movement along but has freedom of angular movement relative to the shaft 10. An axial extension of the gear 48 has an external gear mating with an internal gear of a disc-shaped cam 52 in such a way that the cam 52 cannot rotate relative to the gear 48 but is free to move axially of the gear 48 and shaft 10. That side of the cam 52 which faces away from the gear 48 constitutes a cam face confronting a complementary cam face at the adjacent side of a second disc cam 56. One or more (spherical or other suitable) spreading elements 54 are disposed between the confronting cam faces of the disc cams 52 and 56. The cam 56 includes a hollow cylindrical portion 58 which is rigidly affixed (e.g., welded or riveted) to the axially fixed flange 12 of the pulley 12, 14 on the input shaft 10.

The flange 12 and the disc cam 56 define an annular compartment or chamber 60 for an axially movable piston 62 which is connected to and receives motion from the cam 52. The peripheral surface of the piston 62 has a circumferential groove for a sealing element (such as an O-ring) which sealingly engages the internal surface of the hollow cylindrical portion 58 in all axial positions of the piston 62. The cylindrical internal surface of the piston 62 is slidable along the peripheral surface of the adjacent portion of the shaft 10 to selectively seal or (partially or completely) expose the radially outer ends of the radial or substantially radial bores 64, 68 provided in the shaft 10. The bores 68 communicate with the aforementioned bore 40 which can convey pressurized fluid from the source 94 to the chamber 32. The bores 64 communicate with a further axial bore 66 of the input shaft 10. The bores 64, 66 can convey fluid from the compartment 60 into the sump 92.

The aforedescribed gear 48, cams 52, 56 and piston 62 are parts of the aforementioned torque sensor. Further details of such torque sensor are disclosed in published German patent application Serial No. 1 954 644.

It will be seen that the source (pump 94) supplies pressurized hydraulic fluid to the chamber 40 as well as to the compartment 60 for the piston 62. When the gear 48 receives torque from the rotary output element of the prime mover, such torque is applied to effect an angular displacement of the cams 52, 56 relative to each other. This results in an axial displacement of the piston 62; the extent of such axial displacement of the piston 62 (in a direction to the right, as viewed in FIG. 1 or 2) increases in response to continuous rise of transmitted torque. Thus, the piston 62 seals the radially outer ends of the radial bores 64 to an increasing extent so that the rate at which the fluid can flow from the compartment 60 into the sump 92 (via axial bore 66 of the input shaft 10) decreases. The pressure of fluid in the compartment 60 and in the chamber 32 rises as a function of the magnitude of torque being transmitted from the prime mover to the input shaft 10 by way of the gear 48.

The construction of that portion of the continuously variable transmission which is shown in the upper half of FIG. 2 is identical with that shown in FIG. 1. The upper halves of the flanges 70, 72 shown in FIG. 2 are located at a minimal axial distance from each other, and the flanges 12, 14 are then located at a maximum axial distance from one another (see also the upper half of FIG. 1). The transmission then acts as a step-down transmission, i.e., the RPM of the input shaft 10 greatly exceeds the RPM of the output shaft 74. Furthermore, the chain 16 is then located at a maximum radial distance from the axis of the shaft 74 and at a minimum radial distance from the axis of the shaft 10. Inversely, the transmission acts as a step-up transmission when the flanges 72, 74 are located at a maximum axial distance from each other (see the lower part of FIG. 2) and the flanges 12, 14 are located at a minimum axial distance from each other (see the lower part of FIG. 1). At such time, the chain 16 is distant from the axis of the shaft 10 and close to the axis of the shaft 74.

The manner in which the output shaft 74 of FIG. 2 is rotatably mounted in one or more sets of bearings is not shown in FIG. 2. The flange 72 is rigid (e.g., of one piece) with the shaft 74, and the flange 70 is non-rotatably but axially movably installed on the output shaft. The latter is rigidly connected with a ring-shaped supporting member 80 which is surrounded by a hollow annular element 82 affixed to the flange 70. A sealing element (such as an O-ring) is interposed between the left-hand radial wall of the annular element 82 and the peripheral surface of the supporting ring 80. A piston 84 within the annular element 82 is affixed to the supporting ring 80 and sealingly engages the internal surface of the annular element 82. The parts 84, 82, 70 and 74 define an annular chamber 86 which communicates with an axial blind bore 88 of the output shaft 74 by way of one or more radial bores in the shaft 74. A coil spring 90 or an analogous resilient element is provided in the chamber 86 to urge (by way of the supporting member 80 and the shaft 74) the flange 72 axially of and toward the flange 70 of the pulley on the shaft 74.

The hydraulic system of the aforedescribed continuously variable transmission includes the aforementioned sump 92 and the pump 94 which is normally driven by the input shaft 10, which draws fluid from the sump 92, and which supplies pressurized fluid to the conduits 40a, 40b, i.e., to the bores 40 and 88. A conduit 40c connects the outlet of the pump 94 with an inlet port of a regulating valve 96. The latter serves to selectively supply pressurized fluid to the bore 42 or 44. When the bore 42 receives pressurized fluid from the pump 94 via regulating valve 96, the latter establishes a path for the flow of fluid from the bore 44 into the sump 92, and vice versa. The character 98 denotes a constant pressure valve which can select the pressure of hydraulic fluid in the conduits 40a, 40b, i.e., in the bore 40 of the input shaft 10 and in the bore 88 of the output shaft 74. The pressure of fluid in the bores 40, 88 is a function of the torque being transmitted from the prime mover (not shown) to the gear 48 and disc cams 52, 56 of the torque sensor to the flange 12 which is affixed to the input shaft 10.

When the transmission of FIGS. 1 and 2 is to rotate the output shaft 74 at a maximum speed, the chamber 34 receives pressurized fluid from the pump 94 via conduit 40c, regulating valve 96 and bore 42 of the input shaft 10. At the same time, the valve 96 connects the chamber 36 with the sump 92 by way of the bore 44 and a conduit 40d. The flange 14 then moves axially toward the flange 12 from the position shown in the upper half to the position shown in the lower half of FIG. 1. This entails an increase of the volumes of the chambers 32 and 34 to maximum values because the piston 22 and the flange 14 have moved axially toward the flange 12. The pressure of fluid in the chamber 32 is a function of the magnitude of torque being transmitted by the gear 48 to the flange 12 via torque sensor including the cams 52, 56 and the spreading elements 54 between the cams. The just described axial movement of the flange 14 toward the flange 12 causes that portion of the chain 16 which is looped around the input shaft 10 to migrate radially outwardly of and away from the axis of the shaft 10. This, in turn, causes that portion of the chain 16 which is looped around the output shaft 74 to migrate toward the axis of the shaft 74. Such axial movement of the flange 70 axially and away from the flange 72 takes place against the opposition of the energy storing spring 90 and the fluid in the chamber 86. At such time, the piston 84 moves away from the axial position shown in FIG. 2 above the output shaft 74 to the axial position shown in FIG. 2 below the shaft 74.

If the ratio of the transmission of FIGS. 1 and 2 is to be reduced, i.e., if the flange 14 is to move axially of the input shaft 10 and away from the flange 12, the regulating valve 96 is caused to connect the bore 42 with the sump 92; this results in the establishment of a path for the flow of pressurized fluid from the pump 94, via valve 96 and bore 44 into the chamber 44. At the same time, the chamber 36 is connected with the sump 92 by way of the bore 44 and valve 96. The volumes of the chambers 32, 34 are reduced while the flange 14 moves axially of and away from the flange 12. The just described mode of operation permits for a rapid change of the ratio of the continuously variable transmission. When the flange 14 moves axially of and away from the flange 12, the axial distance between the flanges 70, 72 decreases under the bias of the energy storing element 90 and the torque-dependent rise of fluid pressure in the chamber 86.

The operation of the regulating valve 96 can be controlled to effect the required pressure changes in the chambers 36 and 34 in order to rapidly change the axial distance between the flanges 12, 14 and hence the ratio of the transmission. The axial distance between the flanges 70, 72 changes (in opposite direction) in dependency upon changes in the axial distances between the flanges 12 and 14. This is effected by the chain 16 the overall length of which remains constant.

Since the pressure of fluid in the chambers 32 and 86 is a function of the magnitude of the torque being transmitted by the transmission, the conical surfaces of the four flanges 12, 14 and 70, 72 invariably bear upon the adjacent edge faces of the chain 16. Such pressure upon the edge faces of the chain 16 is not excessive but should be sufficient to ensure that the chain 16 cannot slip relative to the flange 12, 14, 70 and/or 72.

The operation of the regulating valve 96 can be controlled purely hydraulically or electronically. Moreover, the illustrated torque sensor (which is shown as being integrated into the pulley including the flanges 12 and 14) can be replaced with other suitable means which can ascertain the magnitude of transmitted torque and can regulate the fluid pressure in the chambers 32 and 86 accordingly. Still further, the arrangement including the chambers 34, 36 (one of which receives pressurized fluid when the other is free to discharge the confined fluid) as a means for selectively moving the flange 14 toward or away from the flange 12, can be put to use at the input side (as shown in FIGS. 1 and 2), at the output side, or at the input and output sides of the improved continuously variable transmission.

Figures 3, 4:
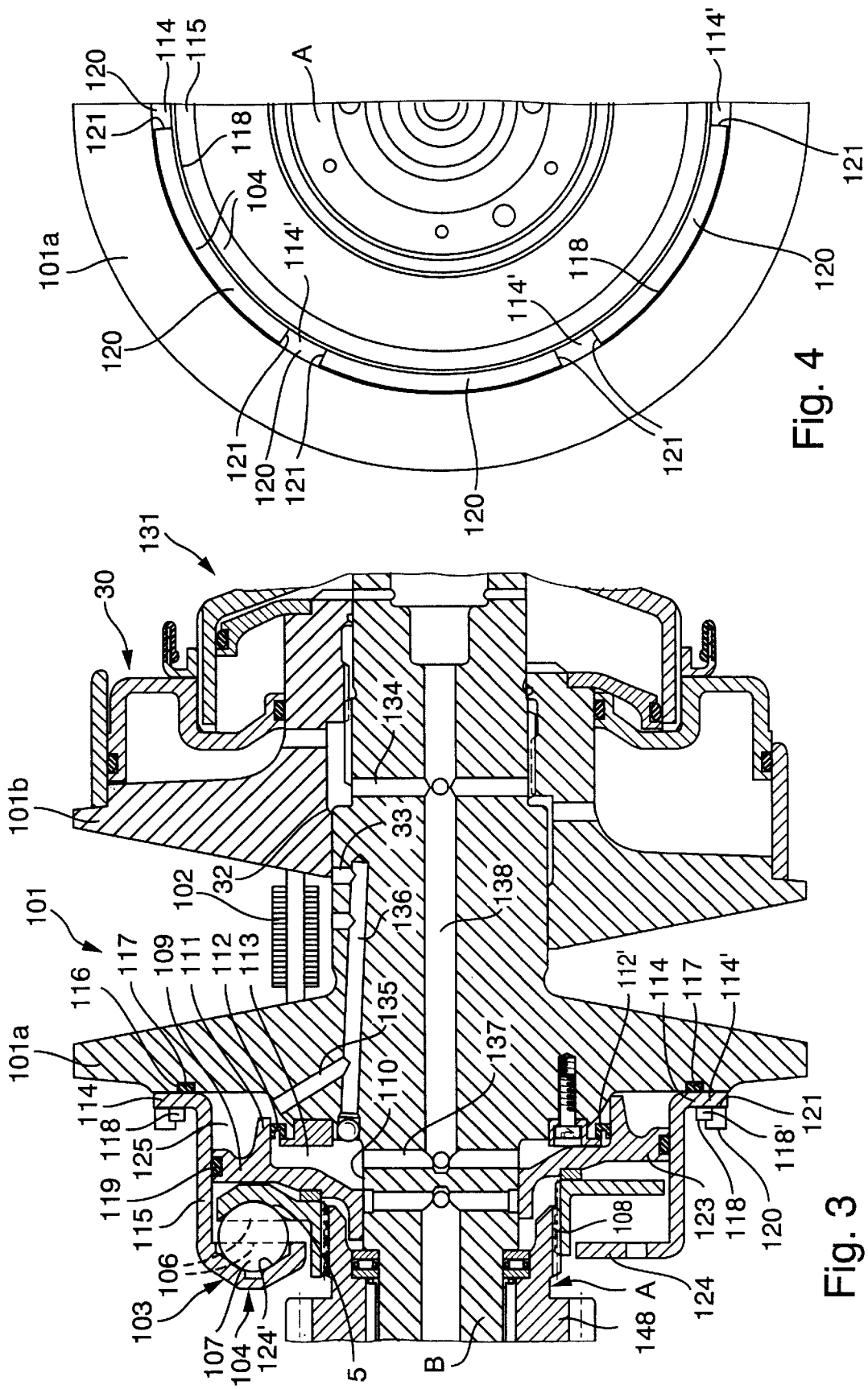
FIG. 3 is a fragmentary axial sectional view of a second continuously variable transmission employing a novel and improved torque sensor which serves to transmit torque from a prime mover to the axially and angularly fixed pulley on the input shaft of the transmission.
FIG. 4 is a fragmentary end elevational view of the torque sensor as seen from the left-hand side of FIG. 3.

FIGS. 3 and 4 show certain details of a modified continuously variable transmission wherein an input shaft B rotatably supports a driver gear 148 corresponding to the driver gear 48 in the transmission of FIGS. 1 and 2. The gear 148 is rotatable relative to but cannot move axially of the input saft B which is of one piece with a conical flange 101a and axially movably but non-rotatably supports a conical flange 101b of the adjustable pulley or sheave 101 corresponding to the pulley including the conical flanges 12, 14 shown in FIGS. 1 and 2. The output shaft and the corresponding pulley (having conical flanges corresponding to the flanges 70, 72 shown in FIG. 2) are not shown in FIGS. 3 and 4. FIG. 3 shows a portion of an endless chain 102 which is caused to migrate radially inwardly (i.e., toward the input shaft B) or radially outwardly, depending upon whether the ratio of the transmission is to be increased or reduced.

The upper half of FIG. 3 shows the conical flanges 101a, 101b of the pulley 101 at a maximum axial distance from each other (the transmission then acts as a step-down transmission). When they assume the positions shown in the lower part of FIG. 3, the flanges 101a, 101b are located at a minimum axial distance from each other and the input shaft B drives the output shaft at a maximum speed.

The character 103 denotes in FIG. 3 a hydromechanical torque sensor which is installed upstream of the pulley 101 and includes two disc cams 104, 105. The cam 105 cannot rotate relative to but is movable axially of the input shaft B. The confronting surfaces of the cams 104, 105 are provided with complementary ramps 106 contacting one or more spherical distancing elements 107. The cam 105 abuts an annular piston 109 which is rotatably and axially movably mounted on the adjacent cylindrical portion 110 of the input shaft B. That side of the annular piston 109 which faces away from the cams 104, 105, i.e., which extends axially of the shaft B in a direction toward the axially movable conical flange 101b of the pulley 101, is provided with an annular extension 111 which is spaced apart from the peripheral surface of the shaft B and axially movably surrounds a complementary annular extension 112 of the flange 101a.

The portion 110 of the input shaft B, the annular piston 109, the extension 111 and a portion of the flange 101a define a first plenum chamber 113 confining a supply of hydraulic fluid at a pressure which is a function of the magnitude of the torque being transmitted by the torque sensor 103 from the driver gear 148 (i.e., from the prime mover such as the engine of a motor vehicle if the continuously variable transmission including the structure shown in FIGS. 3 and 4 is installed in the power train of such vehicle). Such pressure serves to modulate the force with which the flanges 101a, 101b bear upon the marginal surfaces of the chain 102 in order to ensure that the transmission of torque from the input shaft B to the non-illustrated output shaft (corresponding to the output shaft 74 shown in FIG. 2) will take place without any slip or with a minimal slip between the conical surfaces of the flanges 101a, 101b and the chain 102 on the one hand, as well as between the concal flanges of the pulley on the output shaft and the chain 102.

A second annular plenum chamber 125 is defined by the extension 111 of the annular piston 109, a portion of the conical flange 101a and a cylindrical portion of the disc cam 104. The disc cam 104 preferably constitutes a suitably shaped sheet metal component having a radially outwardly extending right-hand end portion or collar 114 at one axial end, and this collar is form-lockingly connected to the flange 101a, i.e., to the flange which is held against axial movement relative to the input shaft B. For example, and as can be readily seen in FIG. 4, the form-locking connection between the flange 101a and the collar 114 can comprise an annular array or set of arcuate projections 120 provided on the flange 101a and having grooves 121 for the protuberances 114' of the collar 114. The radially extending surface of the collar 114 abuts the adjacent radially extending surface of the conical flange 101a. The projections 120 can serve to center the collar 114 (and hence the entire annular piston 109) relative to the flange 101a and input shaft B.

The flange 101a has an annular recess or groove 116 which is provided in the aforementioned radial surface adjacent the radial surface of the collar 114 and serves to receive a portion of a sealing element (such as an O-ring) 117 which contacts the adjacent radially extending surface of the collar 114. In order to ensure that the form-locking connection between the flange 101a and the annular piston 109 will remain intact for extended periods of time, namely that the protuberances 114' will remain in the grooves 121 of the projections 120 on the flange 101a, there is provided a safety ring (e.g., a split ring) 118 which extends into a complementary groove 118' provided on each projection and extending circumferentially as well as axially outwardly from the internal surface of the respective projection 120; this ensures that the ring 118 can hold the collar 114 (and hence the entire annular piston 109) against axial movement away from the flange 101a. The safety ring 118 is located at that side of the collar 114 which faces away from the flange 101a.

The radially outer portion of the annular piston 109 is slidable along the internal surface of the cylindrical radially outer portion 115 of the sheet-metal cam 104. The peripheral surface of the piston 109 has a circumferential groove 123 which receives a portion of a sealing ring 119 (e.g., an O-ring) which sealingly engages the internal surface of the portion 115 of the cam 104.

The cylindrical portion 115 is located between the collar 114 and a radially inwardly extending portion 124; the latter is provided with grooves 124' for portions of the spherical distancing elements 107 of the torque sensor 103. As already explained hereinbefore, the spherical elements 107 operate between the ramps 106 of the cams 104, 105.

An advantage of the transmission which embodies the structure of FIGS. 3 and 4 is that its space requirements in the direction of the axis of the input shaft B are even below those of the corresponding portion of the transmission shown in FIGS. 1 and 2. Thus, the plenum chambers 113 and 125 of the two-stage torque sensor including the structure of FIGS. 3 and 4 are defined by a portion of the sheet metal cam 104, a portion of the axially movable conical flange 101a, a relatively short portion 110 of the input shaft B and the annular piston 109. The latter separates the chambers 113 and 125 from each other.

Another advantage of the two-stage torque sensor 103 is that the disc cam 105 is disposed within the cylindrical portion 115 of the sheet metal ramp 104. The cam 104 receives torque from the gear 148 by way of gear teeth 108 and transmits torque to the cam 105 by way of the spherical elements 107. The elements 107 engage the ramps 106 and are confined in the aforementioned recesses 124'. The thus developing axial forces are applied to the annular piston 109 to raise the pressure of fluid in the chambers 113 and 125.

In order to adequately seal the plenum chambers 113 and 125 from each other, the flange 101 is provided with the aforementioned annular extension 112 which is slidable relative to the annular extension 111 of the piston 109 in the axial direction of the input shaft B. Such mode of sealing the chambers 113, 125 contributes to compactness of the structure defining these chambers as seen in the axial direction of the input shaft B. The compactness is further enhanced by the selection of the positions of the cams 104, 105 relative to each other and the configuration of the cam 104, namely of its radially extending portion 124 and the recesses 124' for the spherical elements 107.

The annular sealing element 112' operates between the concentric extensions 111 and 112; such sealing element can consist of a suitable elastomeric material and is shown as being received in an annular groove of the extension 112.

The mode of operation of the two-stage torque sensor 103 of FIGS. 3 and 4 is as follows:

If the torque which is being transmitted by the prime mover by way of the gear 148 is caused to fluctuate, any surges of torque being transmitted by the prime mover are taken up by the gear 148 which, in turn, causes an axial displacement of the disc cam 105 and annular piston 109 in a direction to reduce the volumes of the plenum chambers 113 and 125. The hydraulic fluid which is expelled from the chambers 113 and 125 is caused to enter the customary cylinder and piston units (not shown in FIGS. 3 and 4) which are used to urge the flanges 101a, 101b of the pulley 101 (and preferably also the flanges of the other pulley on the output shaft of the transmission) into adequate frictional engagement with the adjacent marginal portions of the chain 102. At such time, the torque sensor 103 acts (normally during a relatively short interval of time) as a fluid pump (oil pump). This guarantees a practically instantaneous reaction which ensures that the intensity of frictional engagement between the conical flanges of the pulleys and the adjacent marginal portions of the chain 102 is not excessive but always suffices to ensure a highly predictable transmission of torque from the torque sensor to the output shaft of the transmission.

Abrupt changes in the magnitude of the torque being transmitted from the prime mover to the gear 148 are likely to develop in response to pronounced dynamic changes which develop when the wheels of a motor vehicle roll from a smooth road surface onto a coarser (less slippery) road surface, during rotation of driven wheels of a motor vehicle while out of contact with the road surface and/or during travel on an unsatisfactory road surface (e.g., a surface which exhibits potholes).

The ratio of the selected pressure to the torque is determined geometrically in dependency upon the cross-sectional area(s) of the pressure applying cylinder(s), the radii and the inclination (angles) of the ramps 106 for the spherical elements 107 and/or others. The spherical elements 107 convert the torque into an axial force.

The utilization of the two-stage torque sensor 103 renders it possible to achieve a two-stage shifting corresponding to the ratio of the transmission including the pulley 101 of FIGS. 3 and 4. Such shifting renders it possible to take into consideration the force being applied to the marginal portions of the chain 102 in response to displacement of the chain in the radial direction of the input shaft B. A change of fluid pressure in the plenum chamber 125 (e.g., between positive pressure and no pressure) entails a change of the area of the surface being subject to pressure and hence a change in the ratio between torque and fluid pressure. Such shifting takes place in direct response to that axial shifting of the flange 101b which is required for a change of the transmission ratio and involves automatic regulation (partial or full sealing or a partial or full exposure) of bores in the input shaft B. Thus, when the flange 101b of FIG. 3 is caused to move in a direction toward the flange 101a in response to an appropriate increase of fluid pressure in the hydraulic motor which is utilized to urge the flanges 101a, 101b against the adjacent marginal portions of the chain 102, an annular control edge 132 of the flange 101b reaches an axial position in which the radial bore 134 of the shaft B is free to communicate with a radial bore 133. At such time, the plenum chamber 125 communicates with the chamber of the hydraulic motor 130 via bores, 133, 135, 136. Such mode of operation takes place when the pressure between the flanges of the pulleys and the adjacent marginal portions of the chain 102 need not be very high.

If the pressure in the cylinder of the motor 130 decreases, the flange 101b moves in a direction to the right, as viewed in FIG. 3, and the annular edge 132 of the flange 101b reaches an axial position in which the channel or bore 134 is sealed from the channel or bore 133, i.e., the bore 134 is sealed from the chamber 125. At such time, the chamber of the motor 130 communicates only with the chamber 113 by way of bores or passages or channels 137, 138 in the input shaft B.

Figure 5:
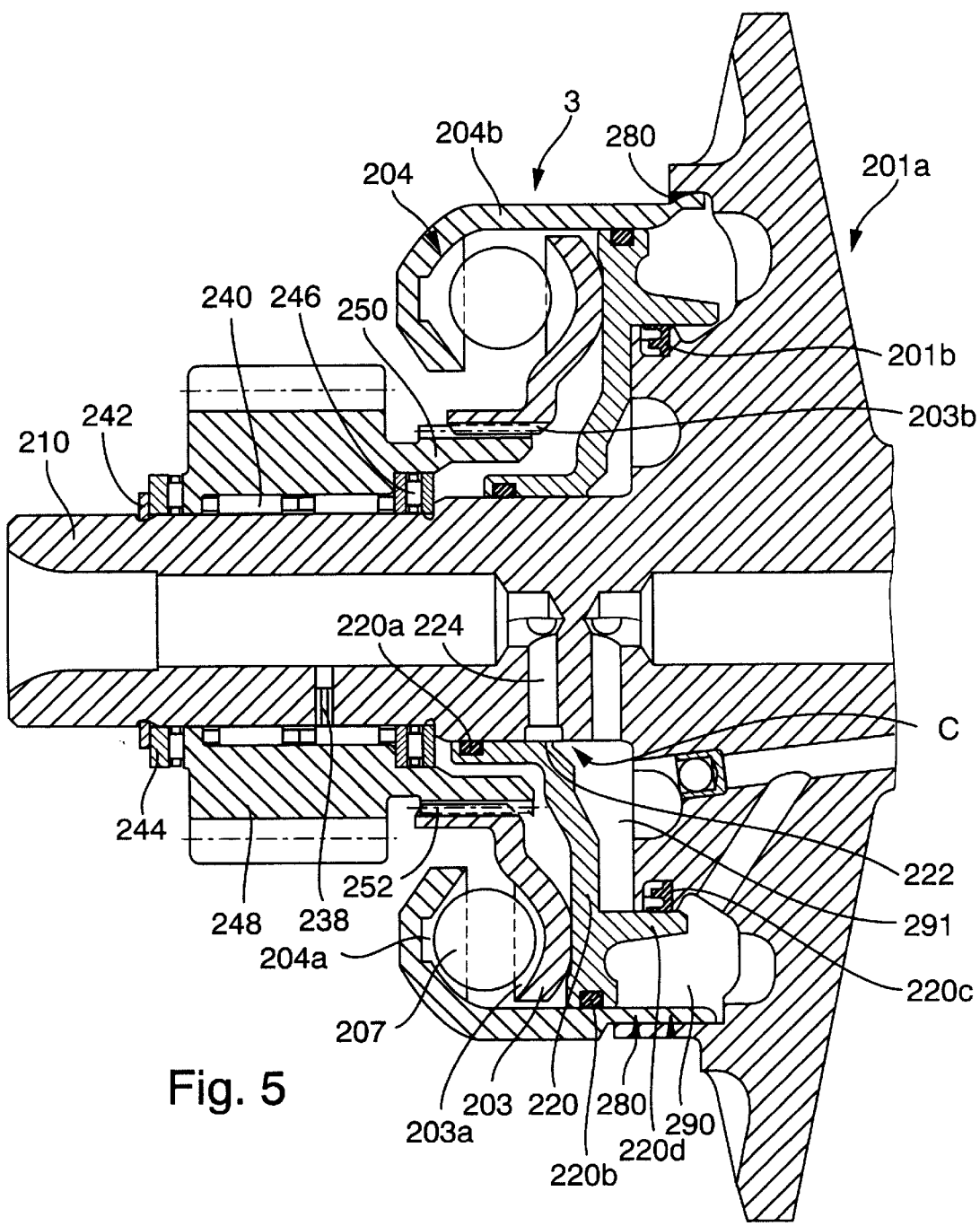
FIG. 5 is a fragmentary axial sectional view of a third transmission employing a torque sensor departing from that shown in FIGS. 3 and 4.

FIG. 5 illustrates a further hydromechanical torque sensor 3A which is installed in a continuously variable transmission. The latter comprises an input shaft 210 which is rigid with one flange 201a of a pulley further having a second flange (not shown) which is movable axially of the shaft 210 toward and away from the flange 201a.

The input shaft 210 further carries a driver gear 248 which is rotatable relative to the shaft 210 between a pair of thrust bearings 244 and 246, i.e., the pinion 248 is held against axial movement relative to the shaft 210. The thrust bearing 242 is held against axial movement away from the thrust bearing 246 by a split ring 242 which is received in a circumferential groove of the shaft 210. The thrust bearing 246 abuts the adjacent end face of an annular piston 220 on the input shaft 210. The split ring 242 is readily insertable into and readily removable from the circumferential groove of the input shaft 210. The thrust bearing 246 abuts an external shoulder at the periphery of the shaft 210. The major portion of the gear 248 is mounted on an elongated radial antifriction bearing 240 which can comprise several annular sets of balls, rollers, needles or the like. A radial bore 238 in the shaft 210 serves to supply a suitable lubricant (such as oil) to the bearings 240, 244 and 246.

The driver gear 248 comprises an axial extension 250 provided with an annulus of external teeth 252. The torque sensor 3A comprises two disc cams 203, 204 having confronting surfaces which are provided with ramps 203a and 204a. The cams 203, 204 are held at a variable axial distance from each other by spherical distancing elements 207. The cam 203 receives torque from the extension 250; to this end, the cam 203 has an internal gear 203b mating with the external teeth 252 of the extension 250 of the gear 248.

The disc cam 204 is constructed in such a way that it comprises a cylindrical portion 204b which spacedly surrounds the cam 203 and the spherical spreading elements 207. That portion of the cam 204 which is provided with the ramps 204a extends substantially radially of the shaft 210 and is preferably of one piece with the cylindrical portion 204b. Furthermore, it is preferred to rigidly affix the cam 204 to one of the conical flanges on the shaft 210, particularly to the axially fixed flange 201a. Still further, it is presently preferred to establish a rigid connection between the cam 204 and the flange 201a, e.g., by welding. For example, the welding apparatus can employ one or more sources of coherent radiation, and the welded seam or seams can extend in the radial and/or in the axial direction of the shaft 210. An advantage of the just described welded connection is that the space requirements of the unit including the parts 204 and 201a are surprisingly small.

The axially movable disc cam 203 of the torque sensor 3A abuts (in the axial direction of the shaft 210) the piston 220 which latter is movable axially of the shaft 210 in response to changes of fluid pressure in the plenum chambers 290 and 291. The piston 220 has a control edge 222 which is movable axially of the shaft 210 to thus expose or seal the radially outer end of a bore 224 serving for evacuation of pressurized fluid from the chamber 291 and/or 290. The fluid pressure in the chambers 290, 291 determines the pressure of fluid in the aforementioned motor means (130) serving to determine the forces acting between the flanges of the two pulleys and the adjacent marginal surfaces of the endless flexible torque transmitting element (not shown in FIG. 5).

The reference character c denotes a clearance which is defined and can be varied by the control edge 222 by selecting the rate of fluid flow from the chamber 291 into the-radial bore 224, i.e., the rate of penetration of the torque sensor 3A into the conical flange. 201a. In the embodiment of FIG. 3, the width of the gap or clearance corresponding to that of the gap c shown in FIG. 5 is selected by a disc-shaped adjuster which can select, in a planned manner, the relationship between one of the disc cams and a conical flange.

The sealing element 117 of FIG. 3 can be omitted if the cylindrical part 115 is sealingly welded to the conical flange 101a.

Referring again to FIG. 5, the fluid pressure in the plenum chambers 290 and 291 depends upon the ratio of the continuously variable transmission including the torque sensor 3A. The fluid pressure in the chambers 290, 291 determines the forces with which the conical flanges (including the flange 201a) bear upon the adjacent marginal portions of the endless flexible element corresponding to the chain 102.

The piston 220 cooperates with annular sealing elements 220a, 222b, 222c to seal the plenum chambers 290, 291 from one another. As can be seen in FIG. 5, the piston 220 comprises a sleeve-like radially inner portion having an internal groove for the sealing element 220a which bears upon the adjacent portion of the peripheral surface of the input shaft 210. The sleeve-like radially inner portion of the piston 220 and the sealing element 220a are movable axially of the shaft 210. The radially outermost portion of the piston 220 has a circumferential recess for the sealing element 220b which bears upon the internal surface of a cylindrical portion 204b of the disc cam 204. The sealing element 220c is recessed into the peripheral surface of a ring-shaped axial extension 201b and bears upon the external surface of an annular extension 220d of the piston 220. The piston 220 comprises a radially extending central portion, the sleeve-like radially inner portion which carries the sealing element 220a, and the sleeve-like portion 220d which is spaced apart from the shaft 210 and from the seal 220b and bears upon the sealing element 220c.

The lower half of FIG. 5 shows that the welded seam 280 is provided between interfitted annular portions of the disc cam 204 and the axially fixed conical flange 201b. This welded seam can hold the cam 204 and the flange 201a against axial and angular movement relative to each other and can further establish a reliable seal between the two interfitted annular portions of the parts 204 and 201a.

Figure 6:
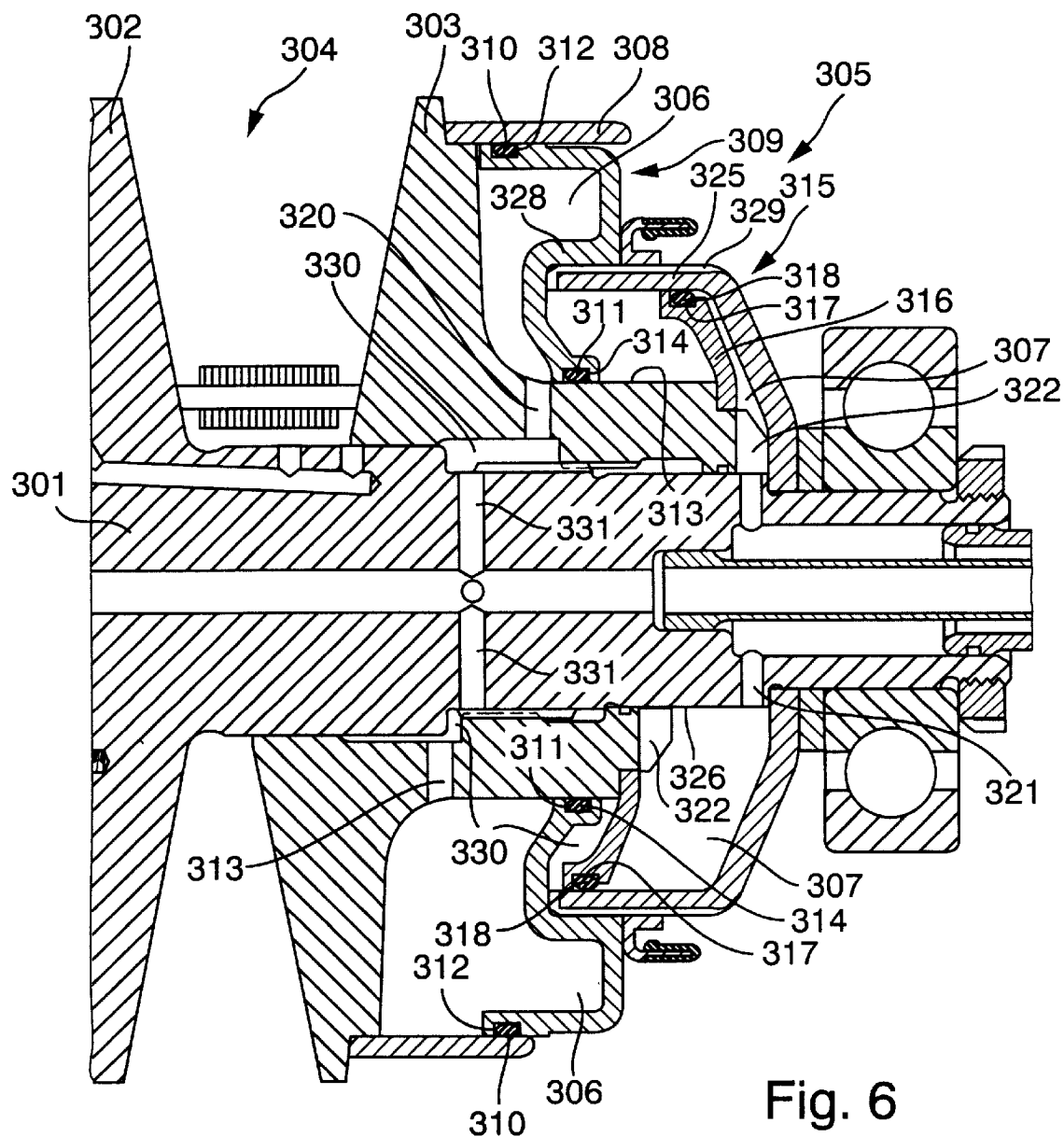
FIG. 6 is a fragmentary axial sectional view of a further continuously variable speed transmission.

Referring to FIG. 6, there is shown a portion of a further continuosly variable transmission which includes an input shaft 301 arranged to receive motion from the rotary output element of a prime mover and carrying a pulley having a conical flange 302 which is rigidly secured to or of one piece with the shaft 301 and a second conical flange 303 which is movable axially of the shaft 301 (toward and away from the flange 302) but cannot turn relative to the latter. An endless flexible element 304 (hereinafter called chain) is trained over the pulley including the flanges 302, 303 as well as over a second pulley (not shown) corresponding to that shown in the lower half of FIG. 2. The upper half of FIG. 6 shows the axially movable flange 303 at a maximum distance from the flange 302 (at such time, the chain 304 is located at a minimum radial distance from the axis of the input shaft 301), and the lower half of FIG. 6 shows the flange 303 in the other end position, namely at a minimum axial distance from the flange 302. The transmission operates in underdrive when the flange 303 is held in the axial position shown in the upper half of FIG. 6, and in overdrive when the flange 303 is caused to assume the other axial end position shown in the lower half of FIG. 6.

The means for shifting the flange 303 axially of the shaft 301 comprises a double-acting cylinder and piston unit 305 having two chambers 306, 307 which are spaced apart from each other in the axial direction of the shaft 301 and are sealed from each other. The chamber 306 is defined by the axially movable flange 303, a cylindrical member 308 which is sealingly secured to the radially outer portion of the flange 303 and is connected to that side of the flange 303 which faces away from the axially fixed flange 302, and a piston 309. The cylindrical member 308 is fixed to the flange 303 in a predetermined radial and in a predetermined axial position. The piston 309 has a radially outer portion having a cylindrical external surface provided with a groove 312 for a sealing element 310 (such as an O-ring) which sealingly engages the cylindrical member 308. The radially innermost portion of the piston 309 has an internal surface provided with a groove 314 receiving a sealing element 311 (such as an O-ring) which engages the external surface of a cylindrical portion 313 of the flange 303.

The transmission of FIG. 6 further comprises a cylindrical member 315 having a radially inner portion which is mounted on and cannot move axially of the input shaft 301. The member 315 is mounted on the shaft 301 to the right of the cylindrical portion 313 of the flange 303. From the radially inner portion at the shaft 301, the cylindrical member 315 extends substantially radially outwardly and thereupon axially (at 325) in parallelism with the axis of the input shaft 301 to form a cylinder having an internal surface contacted by the sealing element 318 in the external groove 317 of an annular piston 316. The left-hand end of the member 315 abuts the adjacent radially extending portion of the piston 309.

The radially inner portion of the piston 316 is affixed to the adjacent right-hand end of a hub which forms part of the axially movable flange 303 and has the aforementioned external surface 326 engaged by the sealing element 311. The plenum chamber 307 is defined by the cylindrical member 315, the piston. 316, the cylindrical portion 326 of the input shaft 301 and the cylindrical portion 313 of the axially movable flange 303 on the input shaft 301 of the transmission shown in FIG. 6.

The plenum chamber 306 can receive hydraulic fluid by way of at least one radial bore 320 of the axially movable flange 303, at least one groove 330 provided in the internal surface of the flange 303 and communicating with the at least one bore 320, and at least one radial channel 331 of the input shaft 301. The channel 331 is connected or connectable with a pump or another suitable source of pressurized fluid. The second plenum chamber 307 can receive hydraulic fluid by way of at least one radial bore 322 of the axially movable flange 303, at least one radial bore 321 of the input shaft 301, and an axial bore (shown but not referenced) of the shaft 301.

The piston 309 includes an annular portion 327 which bulges axially of the shaft 301 toward the flange 303 and includes a radially outer cylindrical portion 328 which centers the portion 325 of the cylindrical member 315. A channel 329 at the exterior of the portion 325 of the cylindrical member 315 facilitates the aeration of the space 330 between the piston 309, the cylinder 315, the piston 316 and the hub having the external surface 313.

An advantage of the continuously variable transmission is that each of the chambers (such as 32, 34 and 36) has its own connection to the source (such as 94) of pressurized hydraulic fluid (see particularly FIG. 3). The third chamber (such as 36) is located between the other chambers (such as 32, 34) as seen in the axial direction of the input shaft, and each of these chambers can receive fluid by way of the regulating valve or valves (such as the valve 96).

In addition, the space requirements of the improved torque sensor (such as the torque sensor including the parts 52, 54, 56) in the axial direction of the shaft (10) are well below those of conventional torque sensors. The controls for the regulating valve means (such as the non-illustrated controls for the valve 96 of FIG. 2) are simple and long-lasting. Moreover, the overall number of parts in the improved transmission and particularly in the improved torque sensor is a fraction of the number of parts in a conventional CVT and a standard torque sensor.

Additional advantages of the aforedescribed continuously variable transmission reside in the provision and positioning of the aforediscussed plenum chambers which renders it possible to select the magnitude of the forces being applied to the marginal portions of the chain independently of the pressure of fluid in the chambers which serve to initiate and effect a change of the transmission ratio. Moreover, the pressure of fluid in the chambers which effect a change of the transmission ratio must be carried out only when a change in the ratio is desired or necessary. The axial forces acting between the chain and the flanges of the pulleys can be changed in a simple, reliable and reproducible manner. The magnitude of forces acting in the axial direction can exceed that which is available in conventional continuously variable transmissions. The radial dimensions of the improved transmission need not exceed those of presently utilized transmissions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of continuously variable transmissions and, therefore, such adaptations should and are intended to be comprehended within the meaning and range of equivalence of the appended claims.

What is claimed is:

1. A continuously variable transmission, comprising:

a first shaft rotatable about a first axis;

a first pulley provided on said shaft;

a second shaft rotatable about a second axis;

a second pulley including a first conical flange affixed to said second shaft and a second conical flange non-rotatably mounted on and movable axially of said second shaft toward and away from said first flange;

an endless flexible element trained over said pulleys; and means for moving said second flange toward and away from said first flange, including a first piston carried by and being held against axial movement relative to said second shaft and defining with said second flange a first annular plenum chamber, a supporting member affixed to said second shaft, a second piston affixed to said second flange and defining with said supporting member a second annular chamber, said first and second pistons defining a third annular chamber disposed between said first and second chambers as seen in the axial direction of said second shaft, discrete first, second and third means for respectively connecting said first, second and third chambers with at least one source of pressurized hydraulic fluid, and means for regulating the flow of fluid in said second and third connecting means to reduce the pressure of fluid in one of said second and third chambers while simultaneously increasing the pressure of fluid in the other of said second and third chambers.

2. The transmission of claim 1, wherein said second flange includes a cylindrical portion remote from the axis of said second shaft and a hub surrounding said second shaft, said first piston being movable axially of said second shaft between said cylindrical portion and said hub of said second flange, said supporting member including a cylindrical wall coaxial with and spaced apart from said second shaft and having an end portion affixed to said first piston, said second piston being movable with said second flange axially of said second shaft and relative to said cylindrical wall, said third connecting means including a first channel provided in said supporting member and a second channel provided in said second shaft.

3. The transmission of claim 1, wherein said first pulley comprises a third conical flange affixed to said first shaft and a fourth conical flange non-rotatably mounted on and movable axially of said first shaft toward and away from said third flange, and further comprising fluid-operated means including a fourth chamber for moving said fourth flange relative to said third flange.

4. The transmission of claim 1, wherein said second flange has a cylindrical portion spacedly surrounding said shaft and extending away from said first flange, said first piston has a radially inner portion slidable along a radially inner portion of said second flange and a radially outer portion slidable within said cylindrical portion of said second flange, said supporting member comprises a cylinder mounted on said shaft, and said second Plenum chamber surrounds said radially inner portion of said second flange.

5. The transmission of claim 3, further comprising means for rotating said second shaft, said endless flexible element being arranged to transmit torque from said second shaft to said first shaft.

6. The transmission of claim 4, wherein said first piston comprises an annular trough radially outwardly adjacent said portion of said second flange, extending toward said first flange and including a cylindrical portion, said cylindrical portion of said trough surrounding a radially outer portion of said cylinder.

7. The transmission of claim 4, further comprising at least one first sealing element disposed between said cylindrical portion of said second flange and said first piston, and at least one second sealing element between said radially inner portion of said first piston and said radially inner portion of said second flange.

8. The transmission of claim 4, further comprising at least one sealing element interposed between said second piston and a cylindrical radially outer portion of said cylinder.

9. The transmission of claim 4, further comprising means for admitting a pressurized hydraulic fluid to said second plenum chamber including at least one first passage provided in said shaft and at least one second passage provided in said radially inner portion of said second flange, said at least one second passage communicating with said at least one first passage in at least one predetermined axial position of said second flange relative to said shaft.

10. The transmission of claim 4, further comprising means for supplying a pressurized hydraulic fluid to said first plenum chamber including at least one first passage provided in said second flange, an internal recess provided in said second flange and communicating with said at least one first passage, and at least one second passage provided in said shaft and communicating with said recess in at least one predetermined axial position of said second flange relative to said shaft.

11. The transmission of claim 5, wherein said fluid-operated means includes means for maintaining the pressure of fluid in said fourth chamber at a value which at least approximates the fluid pressure in said first chamber and is a function of the magnitude of torque being transmitted by said torque transmitting element.

12. The transmission of claim 7, wherein said at least one first sealing element is recessed into one of said cylindrical portion of said second flange and said first piston, said at least one second sealing element being recessed into one of said first piston and said radially inner portion of said second flange.

13. The transmission of claim 8, wherein said at least one sealing element includes a ring recessed into at least one of said cylinder and said second piston.

14. A torque sensor for use in a continuously variable transmission having an input shaft, a pulley including a first flange affixed to said shaft and a second flange non-rotatably mounted on and movable axially of said shaft toward and away from said first flange, and an endless flexible element trained over said pulley, said sensor comprising:

first and second cams coaxial with said input shaft, said cams having confronting surfaces provided with complementary ramps;

at least one spreading element disposed between and contacting said complementary ramps;

a gear coaxial with and rotatably mounted on said shaft, said second cam being non-rotatably and axially movably mounted on said gear;

an annular piston surrounding said shaft, abutting said second cam and movable axially of said shaft, said second cam having a side facing away from said first cam;

first and second annular plenum chambers spacedly surrounding said shaft, one of said chambers being located nearer to said shaft than the other of said chambers, as seen in the radial direction of said shaft; and a disc-shaped member forming part of said first cam, made at least in part of sheet metal, non-rotatably affixed to said first flange and including a substantially cylindrical portion surrounding said chambers and said second cam, said first cam further including an intermediate portion extending from said substantially cylindrical portion toward said shaft and said at least one spreading element being disposed between said intermediate portion of said first cam and said second cam.

15. The torque sensor of claim 14, wherein said piston has a side facing said first flange and including a first annular extension extending toward said first flange and spacedly and concentrically surrounding said shaft, said first flange including a second annular extension and said one plenum chamber being bounded by a peripheral surface of said shaft, by said piston, by said first annular extension and by said first flange, said substantially cylindrical portion of said first cam having an internal surface confronting the periphery of said shaft and being arranged to guide a radially outer portion of said piston for movement in the direction of the axis of said shaft, said other plenum chamber being bounded by said substantially cylindrical portion of said first cam, by said piston, by said second extension and by said first flange.

16. The torque sensor of claim 14, wherein said first cam further comprises an end portion extending substantially radially outwardly from said substantially cylindrical portion and including protuberances, said first flange comprising an annular projection adjacent said end portion of said first cam and coaxial with said shaft, said annular projection having recesses for said protuberances.

17. The torque sensor of claim 14, wherein said intermediate portion of said first cam has at least one recess for said at least one spreading element.

18. The torque sensor of claim 14, further comprising means for moving sad second flange axially of said shaft, including at least one hydraulic motor having a third plenum chamber for a supply of pressurized fluid and means for connecting said third plenum chamber with one of said first and second chambers, said connecting means including passages provided in said shaft and in at least one of said flanges.

19. The torque sensor of claim 14, wherein said second flange has a control edge adjacent said shaft and further comprising at least one hydraulic motor arranged to move said second flange relative to said shaft toward and away from said first flange, said motor having at least one third plenum chamber for a supply of pressurized fluid and further comprising means for connecting at least one of said first and second chambers with said at least one third chamber, said connecting means comprising at least one passage provided in said shaft and having an open end adjacent said control edge so that the control edge can regulate the rate of fluid flow in said at least one passage in response to movement of said second flange relative to said shaft.

20. The torque sensor of claim 15, wherein said radially outer portion of said piston is provided with a sealing element abutting the internal surface of said substantially cylindrical portion of said first cam.

21. The torque sensor of claim 15, further comprising an annular sealing element disposed between said first and second annular extensions.

22. The torque sensor of claim 16, further comprising a sealing element interposed between said first flange and said end portion of said first cam.

23. The torque sensor of claim 16, wherein said annular projection has an internal surface provided with an annular groove, and further comprising a safety ring disposed in said groove to hold said first cam against axial movement relative to said first flange.

24. The torque sensor of claim 20, wherein said radially outer portion of said piston has a circumferential groove for said sealing element.

25. The torque sensor of claim 21, wherein said second annular extension has a groove for said sealing element.

26. The torque sensor of claim 22, wherein said first flange has an annular groove for said sealing element.

* * * * *